US010060500B2

(12) United States Patent
Förster

(10) Patent No.: US 10,060,500 B2
(45) Date of Patent: Aug. 28, 2018

(54) VIBRATION DAMPER AND MOTOR VEHICLE

(71) Applicant: ZF Friedrichshafen AG

(72) Inventor: Andreas Förster, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/310,986

(22) PCT Filed: Apr. 27, 2015

(86) PCT No.: PCT/EP2015/059014
§ 371 (c)(1),
(2) Date: Nov. 14, 2016

(87) PCT Pub. No.: WO2015/185276
PCT Pub. Date: Dec. 10, 2015

(65) Prior Publication Data
US 2017/0074345 A1    Mar. 16, 2017

(30) Foreign Application Priority Data

Jun. 5, 2014   (DE) .................. 10 2014 210 701

(51) Int. Cl.
*F16F 9/34*      (2006.01)
*F16F 9/512*     (2006.01)
(Continued)

(52) U.S. Cl.
CPC ............ *F16F 9/5126* (2013.01); *B60G 13/08* (2013.01); *F16F 9/19* (2013.01); *F16F 9/34* (2013.01);
(Continued)

(58) Field of Classification Search
CPC ......... B60G 13/08; B60G 17/08; F16F 9/187; F16F 9/464; F16F 9/465; F16F 9/512
(Continued)

(56) References Cited

U.S. PATENT DOCUMENTS 4,971,181 A * 11/1990 Zaenglein ............. F16F 9/3271
137/543.17
5,386,892 A *  2/1995 Ashiba ..................... F16F 9/512
188/280

(Continued)

FOREIGN PATENT DOCUMENTS

DE    102005029694    12/2006
DE    102006046333     2/2008
(Continued)

*Primary Examiner* — Christopher P Schwartz
(74) *Attorney, Agent, or Firm* — Cozen O'Connor

(57) ABSTRACT

A vibration damper includes at least one tube element and a piston which is displaceable in axial direction in the tube element, a piston rod connected to the piston, and a damping force generating device, wherein the piston divides the working space in the interior of the tube element into a first working space on the piston rod side and a second working space remote of the piston rod, and wherein a hydraulic transmission element is arranged in or at the piston, and the transmission behavior of the hydraulic transmission element depends on the movement of the piston or of the piston rod, wherein the hydraulic transmission element encloses a compensation volume. The size of the compensation volume of the transmission element depends on the annular area of the piston which is the difference of the cross-sectional area of the piston and the cross-sectional area of the piston rod.

20 Claims, 2 Drawing Sheets

(51) Int. Cl.
*B60G 13/08* (2006.01)
*F16F 9/19* (2006.01)
*F16K 15/02* (2006.01)
*F16F 9/18* (2006.01)

(52) U.S. Cl.
CPC ........ *F16K 15/025* (2013.01); *B60G 2202/24* (2013.01); *B60G 2500/112* (2013.01); *B60G 2800/162* (2013.01); *F16F 9/185* (2013.01); *F16F 2228/066* (2013.01)

(58) Field of Classification Search
USPC ............................ 188/266.6, 322.13, 322.15
See application file for complete search history.

(56) References Cited

U.S. PATENT DOCUMENTS

| | | | |
|---|---|---|---|
| 6,918,473 B2 | 7/2005 | Deferme | |
| 7,172,058 B2* | 2/2007 | Burkert | F16F 9/5126 188/315 |
| 7,958,981 B2* | 6/2011 | Teraoka | F16F 9/5126 188/298 |
| 8,590,677 B2 | 11/2013 | Kim | |
| 9,169,891 B2 | 10/2015 | Teraoka et al. | |
| 2009/0294230 A1* | 12/2009 | Weimann | F16F 9/465 188/266.6 |
| 2010/0101904 A1* | 4/2010 | Rumple | F16F 9/466 188/322.13 |
| 2010/0300822 A1* | 12/2010 | Vannucci | F16F 9/342 188/322.13 |
| 2011/0139557 A1* | 6/2011 | Mangelschots | F16F 9/464 188/322.13 |
| 2012/0325603 A1* | 12/2012 | Ootake | F16F 9/465 188/322.13 |
| 2013/0020158 A1* | 1/2013 | Park | F16F 9/3405 188/280 |

FOREIGN PATENT DOCUMENTS

| | | |
|---|---|---|
| DE | 202008001466 | 6/2008 |
| DE | 102010023434 | 12/2011 |
| DE | 102012208684 | 11/2013 |
| DE | 102013008889 | 11/2014 |

* cited by examiner

VIBRATION DAMPER AND MOTOR VEHICLE

PRIORITY CLAIM

This is a U.S. national stage of application No. PCT/EP2015/059014, filed on Apr. 27, 2015. Priority is claimed on the following application: Country: Germany, Application No.: 10 2014 210 701.6, Filed: Jun. 5, 2014, the content of which is incorporated herein in its entirety by reference.

FIELD OF THE INVENTION

The present invention is directed to a vibration damper comprising at least one tube element and a piston which is displaceable in axial direction in the tube element, a piston rod connected to the piston, and a damping force generating device. The piston divides the working space in the interior of the tube element into a first working space on the piston rod side and a second working space remote of the piston rod, a hydraulic transmission element is arranged in or at the piston, the transmission behavior of the hydraulic transmission element depends on the movement of the piston or of the piston rod, and the hydraulic transmission element encloses a compensation volume.

BACKGROUND OF THE INVENTION

It is known to provide damping systems with variable damping force in vibration dampers so that the damping forces can be adjusted for each individual wheel. It is further known to provide devices in vibration dampers for generating energy, and the damping force generating devices and energy generating devices are hydraulically connected to the oil space or oil spaces of the vibration damper.

However, the arrangement of damping force generating devices and energy generating devices changes the system characteristics of the vibration damper. In particular, a damping force generating device changes the response time of the overall system. For this reason, DE 10 2010 023 434 A1, the entire content of which is hereby incorporated herein by reference, discloses a gas spring damper device and a first hydraulic energy storage hydraulically associated with the first working space and a second hydraulic energy storage hydraulically associated with the second working space. To prevent blockage during high-frequency movements of liquid, DE 10 2010 023 434 A1 the entire content of which is hereby incorporated herein by reference, teaches to provide an additional hydraulic transmission element with a transmission behavior dependent upon a movement dynamic of the piston rod. In this connection, a movement dynamic of the piston rod is an amplitude and/or a frequency of compression movements or rebound movements of the piston rod. A device for amplitude-selective damping is also described as hydraulic transmission element. A swing piston which is spring-loaded on two sides is shown in a purely schematic manner. Accordingly, a compensation is carried out for small amplitudes, i.e., the damping force generating device is bypassed.

In view of the foregoing, an object of the present invention is to provide a vibration damper with a hydraulic transmission element in which the damping force characteristic is further improved.

SUMMARY OF THE INVENTION

The core of the invention is considered to be that the size of the compensation volume of the hydraulic transmission element is determined depending on the annular area of the piston. The annular area of the piston is the difference of the cross-sectional area of the piston and the cross-sectional area of the piston rod, i.e., the surface area of the piston head impinged by oil.

Series of tests were necessary heretofore to determine the compensation volume because no functional relationship could be discerned. However, as a result of the insight that the size of a compensation volume that generates an advantageous damping characteristic depends on the annular area of the piston, expenditure on further necessary test series can be considerably reduced.

The compensation volume can advantageously be greater than or equal to the product of 2 mm times the annular area. With respect to surface area, the compensation volume is determined by the dependency on the annular area of the piston; therefore, only a variation in height remains possible. Surprisingly, it has been shown that a height of at least substantially 2 mm produces the best damping characteristics. This height does not determine the actual height of the compensation space, since this height defines only the volume of the compensation space. The hydraulic transmission element can also be configured so as to have a smaller or larger cross-sectional area than the annular area of the piston. However, the height of the compensation space must then be adapted correspondingly. Accordingly, the specified height of 1 to 3 mm relates only to the calculation of the compensation volume, the space actually reserved for the compensation volume can be configured completely freely.

In addition, it can be postulated as a condition that the compensation volume is less than or equal to the product of 8 to 10 mm, particularly 9 mm, times the annular area. This is accordingly the upper limit of the compensation volume. As has already been stated, this does not determine the specific configuration of the space containing the compensation volume; on the contrary, only the size of the compensation volume can be determined in this way.

Advantageously, the interior of the transmission element can be divided by an inner piston into a first compensation space and a second compensation space. This allows an improvement in damping in the rebound direction and compression direction and defines the hydraulic transmission element. Many arrangements are known from amplitude-selective damping in principle; however, without further modification they cannot be used for the present purpose to obtain a satisfactory damping characteristic.

In an advantageous manner, the travel of the first compensation space is greater than or equal to 0.7 times the travel of the second compensation space. The requirement for an inner piston does not yet determine the extent to which the piston can move in the interior of the hydraulic transmission element or how the compensation spaces are partitioned by the inner piston. Accordingly, one requirement consists in that the height ratio of the compensation spaces may not diverge substantially from one another. In concrete terms, this means that the travel of the compensation space on the piston rod side should be no less than 0.7 times the travel remote of the piston rod. The travel is determined based on the preferred position which is defined, for example, by spring pre-loading.

The travel of the first compensation space can advantageously be less than or equal to two times the travel of the second compensation space. In other words, the compensation space remote of the piston rod is at most twice as large as the compensation space on the piston rod side. The upper and lower limits mentioned above can be realized, for example, by stops or by a corresponding pre-loading of the inner piston.

The first compensation space can advantageously be arranged on the piston rod side. Accordingly, the second compensation space is automatically remote of the piston rod.

Preferably, a spring can be arranged in the first compensation space and/or second compensation space in order to pre-load the inner piston. Because of this pre-loading it is possible for the inner piston to always have a preferred position. This also prevents the inner piston from contacting either the top or bottom of the transmission element so that the transmission element is continuously operational. The movement of the inner piston can advantageously be limited by at least one stop inside the transmission element. The stop prevents an overextension of a spring, for example. Besides this, the ratios of the heights of the first compensation space and second compensation space can also be adjusted via stops and the maximum movement spaces of the inner piston can be limited in direction of the top or bottom of the transmission element via stops. To this end, the stops are preferably shaped annularly. They can be made of elastomeric material or of a material that is not deformable. In particular, it is possible to achieve a fine tuning of the damping behavior of the transmission element by varying the height of the stops.

The hydraulic transmission element can preferably be arranged in or at the piston. The hydraulic transmission element can advantageously be formed in the piston. On the one hand, this makes possible a small installation space in axial direction; on the other hand, the quantity of component parts can also be minimized in this way. However, it is also possible in principle to arrange the hydraulic transmission element outside the piston.

Alternatively, the hydraulic transmission element can be arranged in or at the damping force generating device. The hydraulic transmission element should be provided between the first working space and second working space. On the one hand, this is the case at the piston which divides the working space by definition into a first working space and second working space. However, the working spaces also abut one another in the damping force generating device. Accordingly, the hydraulic transmission element can also be provided in this case.

In an advantageous manner, at least one damping valve, particularly a check valve, can be located at the top and/or bottom of the hydraulic transmission element. The flow path of the oil can be adjusted with the check valve. Accordingly, a damping valve can be arranged between the first working space and the compensation volume or between the second working space and the compensation volume. Also, a plurality of damping valves can be provided per side.

Advantageously, the inner piston can have a seal ring which seals the space between the inner piston and the wall of the transmission element.

In addition, the invention is also directed to a motor vehicle comprising a vibration damper such as is described. The vibration damper is preferably a two-tube damper, particularly a two-tube damper with intermediate wall.

BRIEF DESCRIPTION OF THE DRAWINGS

Further advantages, features and details follow from the embodiments and drawings described hereinafter, in which.

DETAILED DESCRIPTION OF THE PRESENTLY PREFERRED EMBODIMENTS

Figure 1:
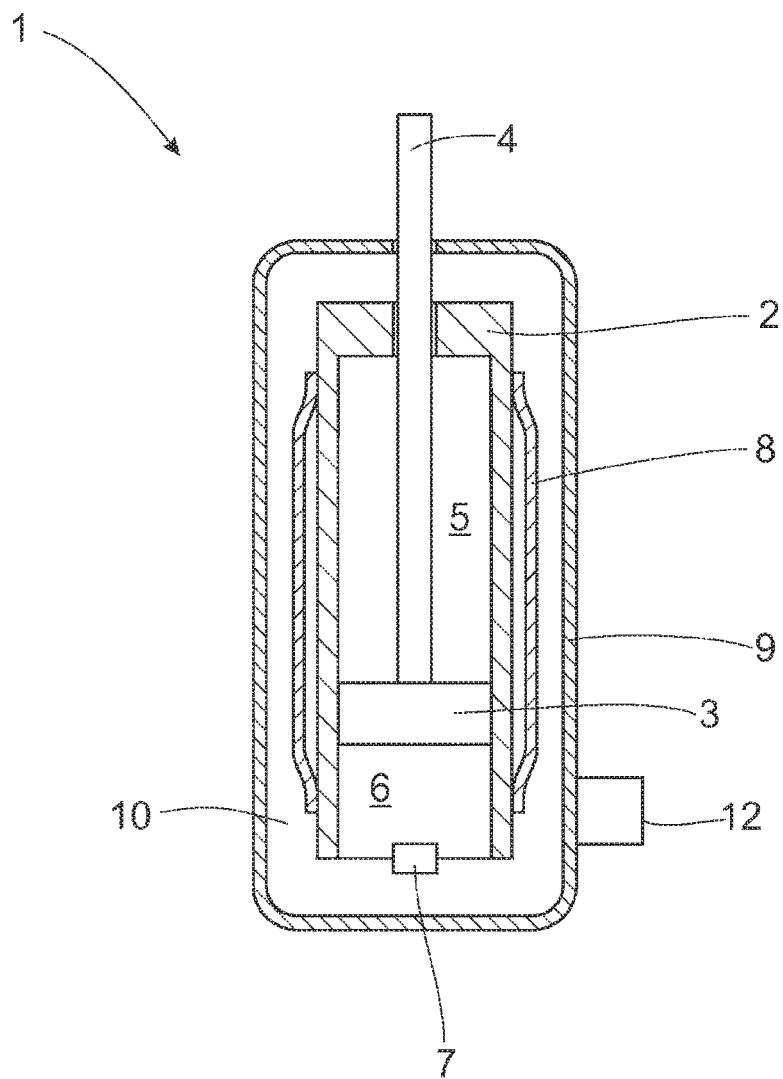
FIG. 1 is a cross-sectional schematic view of a vibration damper of the present invention.

FIG. 1 shows a vibration damper 1 in the form of a two-tube damper. This vibration damper 1 has a tube element of working cylinder 2 in which a piston 3 and a piston rod 4 are moveable. The piston 3 divides the working space inside the working cylinder 2 into an upper working space 5 and a lower working space 6. A valve 7 can be located at the base of the tube element or working cylinder 2. The tube element 2 is partially surrounded by an intermediate tube 8. A further space, the external space 10, is defined by the intermediate tube 8 or working cylinder 2, respectively, and the reservoir tube 9. A damping force generating device 12 is in hydraulic contact with the oil in the external space 10.

This construction is strictly exemplary. In particular, the vibration damper 1 need not function identically to a conventional two-tube damper in spite of the construction. For example, the compensation space can be located elsewhere than in the upper region of the external space 10, and the external space 10 can be connected to the upper working space 5 as well to the lower working space 6 so that the entire external space 10 is filled with oil. Also, a mono-tube damper can be used instead of the two-tube damper. It is important that a damping force generating device 12 hydraulically communicates with the working space, specifically the upper working space 5 and/or the lower working space 6.

The damping force generating device 12 can be an energy generating device and/or a damping force generating device and/or a level control device. In particular, the damping force generating device 12 can be configured to generate energy and to level the motor vehicle. This is the case regardless of the construction of the vibration damper 1 and piston 3.

Figure 2:
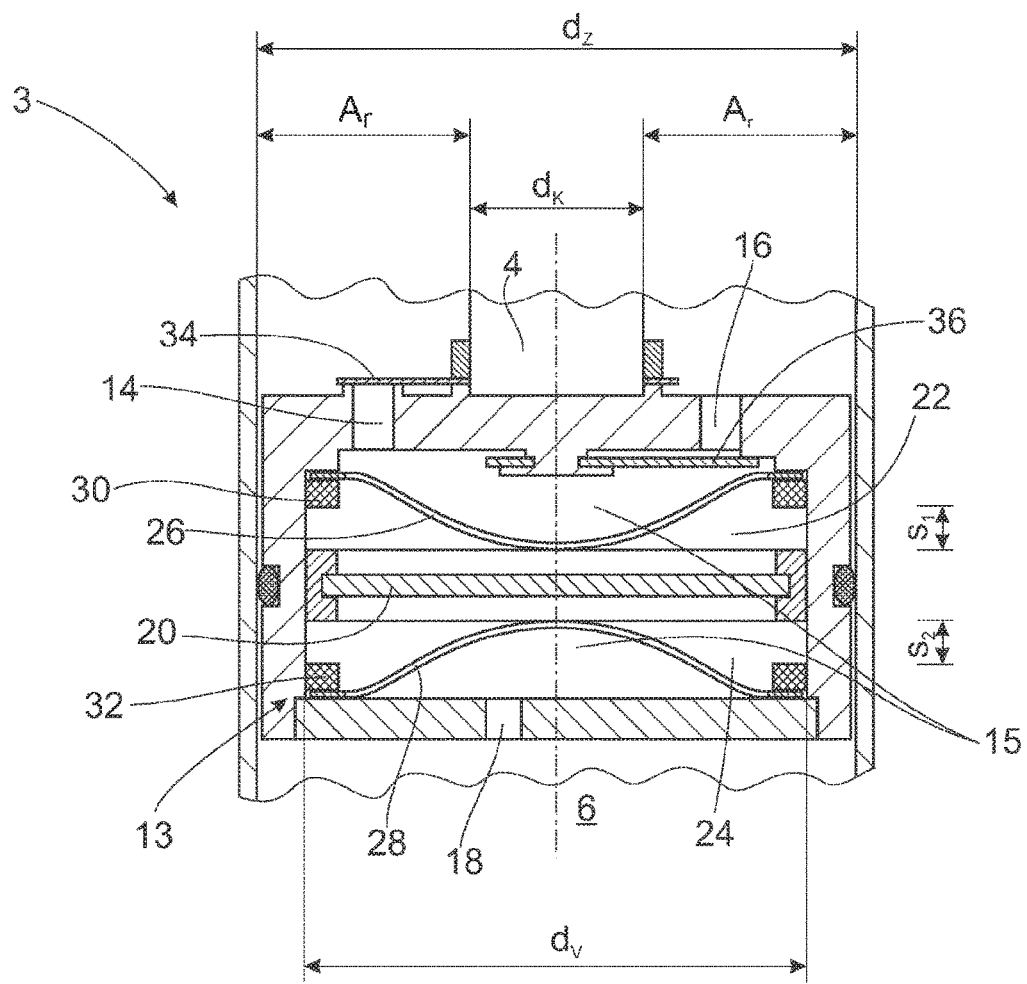
FIG. 2 is a cross-sectional view of a piston of the present invention.

FIG. 2 shows a hydraulic transmission element 13 which is formed in the piston 3. The piston 3 has three passages 14, 16 and 18. Passages 14 and 16 are arranged at the side facing the piston rod, and passage 18 is arranged at the side remote of the piston rod. The interior of the piston 3, which encloses the compensation volume 15, is divided into a first compensation space 22 and a second compensation space 24 by an inner piston 20. Wave springs 26 and 28 pre-load the inner piston 20. Annular stops 30 and 32 are arranged on or, alternatively, under the wave springs 26 and 28. The annular stops 30 and 32 limit the stroke or travel path of the inner piston 20. FIG. 2 further shows the check valves 34 and 36 which cover passages 14 and 16.

The following dimensions are shown in FIG. 2: the diameter dk of the piston rod, the inner diameter of the piston dv, the inner diameter dz of the working cylinder, the travel $S_1$ of the first compensation space 22, and the travel $S_2$ of the second compensation space 24, i.e. the maximum distance the inner piston 20 can travel within the first and second compensation space 22, 24.

The piston 3 or hydraulic transmission element in piston 3 functions as follows: the damping force generating device 12 causes a change in the response behavior of the vibration damper 1. Particularly during high-frequency movements of the piston 3 with low amplitude, functional problems can come about in the damping force generating device 12. To prevent this, the piston 12 has passages 14, 16 and 18. During movements with low amplitude, the oil can arrive in the interior of the piston 3, where it initially causes a movement of the inner piston 20. The piston 3 in its entirety is not moved until the movement amplitude, i.e., the amount of oil flowing, is great enough that the inner piston 20 encounters one of the stops 30 or 32. Not until then is oil displaced in direction of the damping force generating device 12. This means that the piston 3 filters out movements of low amplitude.

Wave springs 26 and 28 keep moving the inner piston 20 into a preferred position. In the preferred position, the height ratios of the first compensation space 22 and second compensation space 24 have a given relationship. This relationship is determined by the following limits:

$$0.7 < S_1/S_2 < 2.$$

Further, it has turned out that the damping characteristic generated by the transmission element 13 is optimal when:

$$2 \text{ mm} \times A_r < V_v < 9 \text{ mm} \times A_r.$$

where Ar is the annular area over the piston 3 given by the inner diameter $d_z$ of the working cylinder and diameter dk of the piston rod:

$$A_r = \frac{\pi}{4}(d_z^2 - d_k^2).$$

Volume $V_v$ is the volume of the compensation space, i.e., the compensation volume 15.

$$V_v = \frac{\pi}{4}d_v^2(S_1 + S_s).$$

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A vibration damper (1) comprising:
   at least one tube element (2) having a working space;
   a piston (3) having a cross-sectional area and an annular area ($A_r$) and being displaceable in said working space;
   a piston rod (4) having a cross-sectional area and being connected to said piston (3);
   said piston (3) dividing said working space in the interior of said tube element (2) into a first working space (5) on a side of the piston rod (4) and a second working space (6) remote of said piston rod (4);
   a damping force generating device (12) hydrodynamically communicating with said working space;
   the piston further comprising a hydrodynamic transmission element (13) having a transmission behavior and being arranged between said first working space (5) and said second working space (6), the transmission behavior of said transmission element (13) depending on a movement of said piston (3) or of said piston rod (4);
   said hydrodynamic transmission element (13) enclosing a compensation volume (15), and wherein the size of said compensation volume (15) of said transmission element (13) depends on said annular area ($A_r$) of said piston (3), said annular area ($A_r$) being defined by the difference of said cross-sectional area of said piston (3) and said cross-sectional area of said piston rod (4).

2. The vibration damper according to claim 1, wherein said transmission element (13) comprises an interior and an inner piston (20) dividing said interior of said transmission element (13) into a first compensation space (22) and a second compensation space (24).

3. The vibration damper according to claim 2, wherein said inner piston (20) is capable of moving into said first compensation space to an extent corresponding to a first travel ($S_1$) and into said second compensation space to an extent corresponding to a second travel ($S_2$), and wherein said first travel ($S_1$) of said first compensation space (22) is greater than or equal to 0.7 times said second travel ($S_2$) of the second compensation space (24).

4. The vibration damper according to claim 3, characterized in that said travel ($S_1$) of the first compensation space (22) is less than or equal to two times the travel ($S_2$) of the second compensation space (24).

5. The vibration damper according claim 3, additionally comprising a spring (26, 28) arranged in said first compensation space (22) and/or said second compensation space (24) for pre-loading said inner piston (20).

6. The vibration damper according to claim 3, additionally comprising at least one stop (30, 32) for limiting a movement of said inner piston (20) inside said transmission element (13).

7. The vibration damper according to claim 2, wherein said first travel ($S_1$) of said first compensation space (22) is less than or equal to two times said second travel ($S_2$) of said second compensation space (24).

8. The vibration damper according claim 7, additionally comprising a spring (26, 28) arranged in said first compensation space (22) and/or said second compensation space (24) for pre-loading said inner piston (20).

9. The vibration damper according claim 2, wherein said first compensation space (22) is arranged on the piston rod side.

10. The vibration damper according claim 2, additionally comprising a spring (26, 28) arranged in said first compensation space (22) and/or said second compensation space (24) for pre-loading said inner piston (20).

11. The vibration damper according to claim 2, additionally comprising at least one stop (30, 32) for limiting a movement of said inner piston (20) inside said transmission element (13).

12. The vibration damper according to claim 1, wherein said compensation volume (15) is greater than or equal to the product of 2 mm times said annular area ($A_r$).

13. The vibration damper according to claim 12, wherein said compensation volume (15) is less than or equal to the product of 9 mm times said annular area ($A_r$).

14. A motor vehicle comprising a vibration damper (1) according to claim 12.

15. The vibration damper according to claim 1, wherein said compensation volume (15) is less than or equal to the product of 9 mm times said annular area ($A_r$).

16. A motor vehicle comprising a vibration damper (1) according to claim 15.

17. The vibration damper according to claim 1, wherein said hydraulic transmission element (13) is arranged in or at said piston (3).

18. The vibration damper according to claim 1, wherein said hydraulic transmission element (13) is arranged in or at said damping force generating device (12).

19. The vibration damper according to claim 1, wherein said transmission element comprises a top and a bottom; and additionally comprising at least one damping valve (34, 36) located at said top and/or bottom of said hydraulic transmission element (13).

20. A motor vehicle comprising a vibration damper (1) according to claim 1.

* * * * *